May 15, 1962 A. G. MANKE ETAL 3,035,171
RECEIVING SYSTEM
Original Filed Nov. 4, 1955
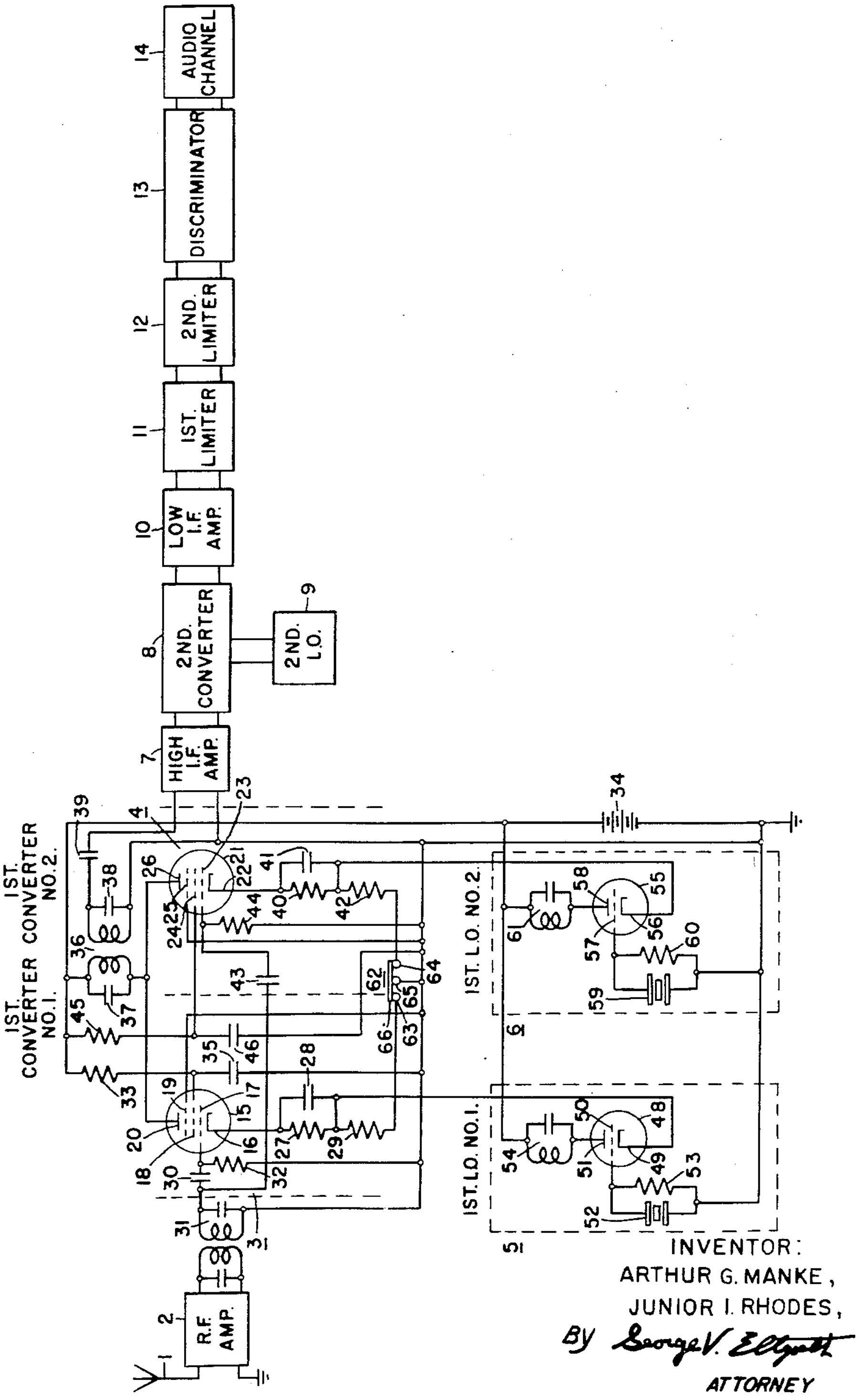
INVENTOR:
ARTHUR G. MANKE,
JUNIOR I. RHODES,
By George V. Elgrott
ATTORNEY United States Patent Office 3,035,171
Patented May 15, 1962

3,035,171
RECEIVING SYSTEM

Arthur G. Manke, Fayetteville, and Junior I. Rhodes, North Syracuse, N.Y., assignors to General Electric Company, a corporation of New York Continuation of abandoned application Ser. No. 544,935, Nov. 4, 1955. This application Aug. 21, 1958, Ser. No. 756,320
7 Claims. (Cl. 250—20)

The present invention relates to receiving systems and has as an object thereof to provide an improved means for receiving a plurality of signals. The present application comprises a continuation of copending application Serial No. 544,935, filed November 4, 1955, now abandonded.

Another object of the present invention is to provide improved means for simultaneously monitoring a plurality of carrier modulated wave channels.

In carrying out the present invention, in one form, there is provided a pair of converter devices, each including a pair of input circuits and a common output circuit. One input circuit of each of the converter devices is responsive to one of a pair of carrier modulated waves each having a different carrier frequency. To the other input circuit of one of said converter devices is applied a wave having a frequency differing on the low side from the carrier frequency of one of said waves by a predetermined value. To the other input circuit of the other of said converter devices is applied a wave having a frequency higher than the higher of the carrier frequencies of said two carrier waves by said predetermined value. Thus, the output of each of the converter devices is a modulated carrier wave having the same carrier frequency.

Novel features which are believed to be characteristic of this invention are set forth in particularity in the appended claims. The invention itself, however, both as to its organization and method of operation, together with further objects and advantages thereof, may best be understood by reference to the following description taken in connection with the accompanying drawings in which is shown an illustrative embodiment of the present invention, partially in schematic as applied to a frequency modulated receiver.

Referring now to the single figure of the drawing, there is shown an illustrative embodiment of a receiver system embodying the present invention. This system includes an antenna 1 for receiving frequency modulated carrier waves and a radio frequency amplifier 2 for amplifying the received frequency modulated carrier waves lying in a particular band of frequencies. The output from the radio frequency amplifier 2 is coupled to first converter 3 and second converter 4. Local oscillators 5 and 6 function in conjunction with the converters 3 and 4, respectively. The output from the converters 3 and 4 are coupled to high intermediate frequency amplifier 7. The receiver additionally includes a second converter 8, a second local oscillator 9, a low intermediate frequency amplifier 10, a first limiter 11, a second limiter 12, a discriminator 13 and an audio channel 14, the latter recited elements being entirely conventional in frequency modulated receivers.

Referring now particularly to the schematic portion of the drawing, first converter 3 comprises an electron discharge device 15, including a cathode 16, a grid 17, a screen grid 18, suppressor grid 19 and an anode 20. Second converter 4 comprises an electron discharge device 21, including a cathode 22, a grid 23, a screen grid 24, a suppressor grid 25 and an anode 26. Cathode 16 of electron discharge device 15 is connected through bias resistance 27 bypassed by by-pass capacitor 28 and through degenerative coupling resistance 29 and switch 62 to ground. Grid 17 is connected through coupling capacitor 30 to one side of tuned circuit 31, the other side of which is connected to ground. Grid 17 is also connected through grid resistance 32 to ground. Screen grid 18 is connected through screen load resistance 33 to the positive terminal of source of operating potential 34, the negative terminal of which is connected to ground. Screen grid 18 is also connected to ground through by-pass capacitor 35. The suppressor grid 19 is connected to ground. The anode 20 is connected through the primary winding of tuned transformer 36 to the positive terminal of source 34. The primary winding of tuned transformer 36 is tuned by capacitance 37 connected in shunt therewith. The secondary winding of tuned transformer 36 is shunted by tuning capacitor 38. One end of the secondary winding of tuned transformer 36 is connected to ground, the other end is capacitively coupled through capacitor 39 to the input of the high intermediate frequency amplifier 7.

Cathode 22 of electron discharge device 21 is connected through cathode bias resistance 40 bypassed by by-pass capacitor 41 through degenerative coupling resistance 42, and switch 62 to ground. The grid 23 is connected through coupling capacitor 43 to the ungrounded side of the tuned circuit 31. The grid 23 is also connected through grid resistance 44 to ground. The screen 24 is connected through screen load resistance 45 to the positive terminal of the source of operating potential 34. The screen 24 is also connected through screen by-pass capacitor 46 to ground. The suppressor grid 25 is connected to ground. The anode 26 is connected to the anode 20. Converter 3 and converter 4 are supplied with signals received from the radio frequency amplifier 2 via tuned circuit 31 and respectively grid 17 of electron discharge device 15 and grid 23 of electron discharge device 21.

The cathode circuits of converters 3 and 4 are supplied with local oscillations from local oscillators 5 and 6, respectively. Local oscillator 5 comprises an electron discharge device 48, including a cathode 49, a grid 50 and an anode 51. The cathode 49 is connected to the junction of resistances 27 and 29. The grid 50 is connected through piezoelectric device 52, by-passed by grid leak resistance 53 to ground. The piezoelectric device is arranged to preferably operate on a harmonic of its fundamental mode of oscillation for simplifying the apparatus necessary to develop the desired higher frequency usually necessary in radio communication converter arrangements. The anode 51 is connected through tuned circuit 54 to positive terminal of source of operating potential 34.

The local oscillator 6 comprises an electron discharge device 55, including a cathode 56, a grid 57 and an anode 58. The cathode 56 is connected to the junction of resistances 40 and 42. The grid 57 is connected through piezoelectric device 59, by-passed by grid leak resistance 60 to ground. The anode 58 is connected through tuned circuit 61 to the positive terminal of source 34.

Resistances 29 and 42 are connected to ground through switch device 62 which includes a terminal 63 connected to one end of resistance 29, a terminal 64 connected to the corresponding end of resistance 42, and a terminal 65 connected to ground. Switch 62 includes a shorting member 66 which in one position shorts the contacts 63, 64 and 65 together grounding the ends of resistances 29 and 42. In another position, shorting bar 66 is permitted to ground only terminals 63 to 65, thus in effect rendering converter 4 inoperative. Also, with the shorting member 66 in the extreme right position, contact is made between terminals 64 and 65, thereby disconnecting the converter 3 from circuit and rendering it inoperative.

The present invention is particularly useful for simultaneously monitoring two frequency modulated carrier wave channels at adjacent carrier frequencies. The two carrier frequencies are spaced such that the tuned circuits of the R-F amplifier 2 are able to pass received waves on to the converters 3 and 4. The switch 62 is maintained in a position such that both converters 3 and 4 are operating. Waves appearing in the output circuit of the R-F amplifier 2 from antenna 1 are applied via tuned circuit 31 to the grid input circuits of converters 3 and 4. The frequency of the wave developed by local oscillator 5 is arranged to be lower in frequency than the lower of the two carrier frequencies by a predetermined difference in frequency. Similarly, the frequency of the output of the local oscillator 6 is arranged to be higher than the higher of the two carrier frequencies by the same predetermined difference in frequency. The application of these waves to converters 3 and 4, respectively, cause the appearance in the common output circuit of the converters of the two carrier modulated waves each having a carrier frequency equal to the predetermined difference frequency. The tuned circuit in the output of the converters 3 and 4 comprising the primary winding of transformer 36 and the capacitance 37 is tuned to this difference frequency. Accordingly, it is seen that in this output circuit two frequency modulated carrier waves having carrier frequencies adjacent to one another are converted in effect to two other waves of the same but lower carrier frequency. Thus the two frequencies can be monitored simultaneously.

An advantage of the arrangement of having the local oscillator frequencies lie outside of the range including the carrier frequencies of the applied frequency modulated signals is that cross-modulation and other undesirable interfering effects in the converters are substantially avoided.

In the arrangement of the present invention of coupling the local oscillator waves into the cathode circuits of the converters while the incoming carrier modulated waves are applied to the grids of the converter devices 3 and 4, cross-modulation and loading effects of one oscillator on the other are substantially eliminated, inasmuch as the grid-cathode capacitance of one of the converter devices effectively affords a high impedance to currents passing to the other local oscillator device. Further isolation of the two oscillators can be obtained by injecting voltage from each of the oscillators 5 and 6 onto the suppressor grid of respective electron discharge devices 15 and 21. Also the waves from each of oscillators 5 and 6 could be applied to the screen grid of electron discharge devices 15 and 21, respectively, or to a suppressor grid of one electron discharge device and a screen grid of the other electron discharge device. In such a case, it will be understood that the cathode resistances may be by-passed. It will also be understood that three electrode electron discharge devices as well as five electrode electron discharge devices may be used for the converter function. Also, semiconductor type translating devices may as well be used for this purpose.

Another advantage of applicants' arrangement is that by the use of unbypassed resistances 29 and 42 in the cathode circuits of the converters 3 and 4, respectively, for the coupling function, sufficient degeneration is introduced into the converter circuits thereby minimizing loading of the input circuits of the converter devices and consequent tuning thereof.

Should it be desired to receive or monitor more than two frequencies, this can be accomplished by injecting local oscillations as shown and, in addition, injecting a third conversion frequency onto the suppressor grid of one of the electron discharge devices 15 and 21.

While there has been shown a particular embodiment of the invention, it will, of course, be understood that it is not limited thereto since many modifications both in circuit arrangement and in the instrumentalities employed may be made and it is, therefore, contemplated by the appended claims to cover any such modifications that come within the true spirit and scope of our invention.

What we claim as new and desired to secure by Letters Patent of the United States is:

1. In combination, in an FM radio receiver, a pair of frequency converters, each including a pair of input circuits and an output circuit, means for applying carrier waves of different carrier frequencies to an input circuit of each of said converters, means for applying to the other input circuit of one of said converters a wave having a frequency below the lower in frequency of said carrier waves by a predetermined value, means for applying to the other of said converters a wave having a frequency above the higher in frequency of said carrier waves by said predetermined value, means for deriving from the output circuit of said converters carrier waves having the same carrier frequency, and means including a limiter responsive to only the substantially stronger of said derived waves from both of said converters when carrier waves of the two different carrier frequencies are received simultaneously.

2. In combination, in an FM radio receiver, a pair of frequency converters each including an input electrode, an output electrode, and a common electrode, means for applying modulated carrier waves of different frequencies between each of said input electrodes and a predetermined potential point, means for applying between one of said common electrodes and said predetermined potential point a wave having a frequency below the lower in frequency of said carrier waves by a predetermined frequency, means for applying between the other of said common electrodes and said predetermined potential point a wave having a frequency above the higher in frequency of said carrier waves by said predetermined frequency, an output circuit connected between each of said output electrodes and said predetermined potential point for deriving from said devices modulated carrier waves having a carrier frequency equal to said difference in frequency, and means including a limiter coupled to said output circuit responsive only to the substantially stronger signal from said pair of frequency converters when said modulated carrier waves of different frequencies are applied simultaneously.

3. In combination, in an FM radio receiver, a pair of frequency converters, each including an input electrode, an output electrode, and a common electrode, means for applying carrier waves of different frequencies between each of said input electrodes and ground, an unbypassed resistive element connected between one of said common electrodes and ground, means for applying across said resistive element a wave having a frequency below the lower frequency of said carrier waves by a predetermined frequency, another unbypassed resistive element connected between the other of said common electrodes and ground, means for applying a wave having a frequency above the higher in frequency of said carrier waves by said predetermined frequency across said other resistive element, an output circuit connected between each of said output electrodes and ground for deriving from said devices carrier waves having the same carrier frequencies, and means including a limiter coupled to said output circuit responsive only to the substantially stronger signal from said pair of frequency converters when said modulated carrier waves of different frequencies are applied simultaneously.

4. In combination, in an FM radio receiver, a pair of electron discharge devices, each including a cathode, a grid and an anode, means for coupling carrier waves of different frequencies between each of said grids and ground, a pair of unbypassed resistances each connected between a respective cathode and ground, means for applying across one of said resistances a wave having a frequency below the lower in frequency of said carrier waves by a predetermined difference in frequency, means for applying across the other of said resistances a wave having a frequency above the higher in frequency of said carrier waves by said predetermined difference, an output circuit tuned to said difference in frequency connected between each of said anodes and ground for deriving from said devices carrier waves having the same frequencies for converting said carrier waves of different waves to carrier waves of the same frequency, and means including a limiter coupled to said output circuits and responsive only to the substantially stronger of said carrier waves of different frequencies when said carrier waves of different frequencies are received simultaneously.

5. In a radio receiving system for receiving frequency modulated waves, including a converter having a pair of input circuits and an output circuit to one input circuit of which is applied a first modulated carrier wave and to the other input circuit of which is applied a wave having a frequency differing from the carrier frequency of said first modulated carrier wave by a predetermined frequency, and from the output circuit of which is obtained a second modulated carrier wave having a carrier frequency equal to said difference in frequency, the combination including another converter, including a pair of input circuits and an output circuit, one of said input circuits being coupled to the input circuit of said one converter, the output circuit of said other converter being coupled to the output circuit of said one converter, means for applying to the other input circuit of said other converter a wave having a frequency differing from the frequency of a third modulated carrier wave applied to the input circuits of said converter by said predetermined difference in frequency, said frequency of said other wave being arranged such that said two carrier frequencies lie between said two applied converting frequencies, and means including a limiter responsive only to the substantially stronger of the signals from said output circuits when waves of said two carrier frequencies are received simultaneously.

6. FM receiving apparatus for simultaneously monitoring a pair of frequencies comprising first and second frequency converters, a first local oscillator developing a signal having a frequency which is lower than the lower of said pair of frequencies by a predetermined frequency, a second local oscillator developing signal having a frequency which is higher than the higher of said pair of frequencies by said predetermined frequency, said first frequency converter being responsive to a received signal at the lower of said pair of frequencies and to the signal from said first local oscillator to develop an output signal at said predetermined frequency, said second frequency converter being responsive to a received signal at the higher of said pair of frequencies and to the signal from said second local oscillator to develop an output signal at said predetermined frequency, and limiting means responsive only to the substantially stronger output signals of said first and second frequency converters when signals of said pair of frequencies are received simultaneously.

7. FM receiving apparatus comprising first means responsive to a frequency-modulated signal of a first frequency for producing a frequency-modulated signal of a second frequency, second means responsive to a frequency-modulated signal of a third frequency different than said first frequency for producing a frequency-modulated signal of said second frequency, and means including limiting means responsive to frequency-modulated signals of said second frequency and, when frequency-modulated signals of said first and third frequencies are present simultaneously, responsive only to the substantially stronger of said frequency-modulated signals of said first and third frequencies.

References Cited in the file of this patent

UNITED STATES PATENTS

| | | |
|---|---|---|
| 1,746,446 | Shapiro | Feb. 11, 1930 |
| 1,968,099 | Shumard | July 31, 1934 |
| 2,108,088 | Tufts | Feb. 15, 1938 |
| 2,266,670 | Winfield | Dec. 16, 1941 |
| 2,664,501 | Whidden | Dec. 29, 1953 |